United States Patent
Kim et al.

(10) Patent No.: US 10,395,425 B2
(45) Date of Patent: Aug. 27, 2019

(54) SYSTEM, METHOD AND RECORDING MEDIUM FOR MANNEQUIN POSE CONTROL

(71) Applicant: International Business Machines Corporation, Armonk, NY (US)

(72) Inventors: Minkyong Kim, Scarsdale, NY (US); Clifford A. Pickover, Yorktown Heights, NY (US); Valentina Salapura, Chappaqua, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 306 days.

(21) Appl. No.: 15/228,492

(22) Filed: Aug. 4, 2016

(65) Prior Publication Data
US 2018/0039240 A1 Feb. 8, 2018

(51) Int. Cl.
| | | |
|---|---|---|
| G05B 15/02 | (2006.01) |
| G06F 17/30 | (2006.01) |
| G06T 19/00 | (2011.01) |
| A47G 25/14 | (2006.01) |
| A47F 8/00 | (2006.01) |

(52) U.S. Cl.
CPC .......... *G06T 19/00* (2013.01); *A47G 25/1407* (2013.01); *A47F 8/00* (2013.01)

(58) Field of Classification Search
CPC ........ A47F 8/00; G06T 19/00; A47G 25/1407
See application file for complete search history.

(56) References Cited

U.S. PATENT DOCUMENTS

| | | | |
|---|---|---|---|
| 6,257,467 B1 | 7/2001 | Chen | |
| 8,915,430 B2* | 12/2014 | Shah | G06K 7/065 |
| | | | 235/375 |
| 8,970,585 B2 | 3/2015 | Weaver | |
| 9,554,096 B1* | 1/2017 | Eakins | A41H 5/01 |
| 9,696,130 B1* | 7/2017 | Eakins | G01B 5/02 |
| 9,717,357 B2* | 8/2017 | Johnson | G06Q 10/08 |
| 9,901,192 B2* | 2/2018 | Tiggett, Jr. | A47F 8/00 |
| 2006/0124673 A1* | 6/2006 | Matsui | A47F 8/00 |
| | | | 223/120 |

(Continued)

FOREIGN PATENT DOCUMENTS

GB        2 400 686 A       10/2004

OTHER PUBLICATIONS

Mel, et al. "The NIST Definition of Cloud Computing". Recommendations of the National Institute of Standards and Technology. Nov. 16, 2015.

(Continued)

*Primary Examiner* — Abdelmoniem I Elamin
(74) *Attorney, Agent, or Firm* — Rahan Uddin, Esq.; McGinn IP Law Group, PLLC

(57) ABSTRACT

A mannequin pose control computer-implemented method, system, and computer program product, includes reading clothing data of an article of clothing on a mannequin, determining a pose for the mannequin by associating the clothing data with a record in a database that includes the pose for the mannequin, and changing a current pose of the mannequin to match the pose for the mannequin based on the record in the database.

20 Claims, 4 Drawing Sheets

(56) References Cited

U.S. PATENT DOCUMENTS

| | | | |
|---|---|---|---|
| 2009/0134213 A1* | 5/2009 | Ha | D06F 58/10 |
| | | | 235/375 |
| 2013/0238285 A1 | 9/2013 | Volchek | |
| 2013/0292428 A1 | 11/2013 | Catanese et al. | |
| 2015/0004584 A1* | 1/2015 | Galibois | G09B 23/30 |
| | | | 434/270 |
| 2015/0189937 A1 | 7/2015 | Chan et al. | |
| 2017/0000277 A1* | 1/2017 | Johnson | G06Q 10/08 |
| 2017/0228911 A1* | 8/2017 | Zylberberg | F16M 11/42 |

OTHER PUBLICATIONS

Reitberger, et al. "A Persuasive Interactive Mannequin for Shop Windows". Apr. 26, 2009.

\* cited by examiner

SYSTEM, METHOD AND RECORDING MEDIUM FOR MANNEQUIN POSE CONTROL

BACKGROUND

The present invention relates generally to a mannequin pose control and more particularly, but not by way of limitation, to a system, a computer-implemented method, and computer program product for controlling a pose of a mannequin based on clothing data associated with a record of a database to map the clothing data with the pose.

Mannequins are conventionally used to display apparel such as clothes. Such apparel may appeal to different demographics of people. The apparel is more effectively displayed and represented when the mannequin assumes different or particular poses, based on the precise piece of clothing that is worn. For example, a wedding dress would benefit from a different mannequin pose than that of a hip-hop outfit.

Some conventional techniques have considered causing a mannequin to mimic or imitate a pose of a person viewing the mannequin. However, the conventional techniques can result in poses not suited for the type of clothing such as a mannequin in a wedding dress imitating a pose that would be more typical of fitness apparel.

Moreover, there is a need in the art to control a pose of a mannequin based on a type of clothing and features of the mannequin.

SUMMARY

In an exemplary embodiment, the present invention can provide a computer-implemented mannequin pose control method, the method including reading clothing data of an article of clothing on a mannequin, determining a pose for the mannequin by associating the clothing data with a record in a database that includes the pose for the mannequin, and changing a current pose of the mannequin to match the pose for the mannequin based on the record in the database.

Further, in another exemplary embodiment, the present invention can provide a computer program product for mannequin pose control, the computer program product comprising a computer readable storage medium having program instructions embodied therewith, the program instructions executable by a device to cause the device to perform: reading clothing data of an article of clothing on a mannequin, determining a pose for the mannequin by associating the clothing data with a record in a database that includes the pose for the mannequin, and changing a current pose of the mannequin to match the pose for the mannequin based on the record in the database.

Even further, in another exemplary embodiment, the present invention can provide a mannequin pose control system, said system including a processor, and a memory, the memory storing instructions to cause the processor to: read clothing data of an article of clothing on a mannequin, determine a pose for the mannequin by associating the clothing data with a record in a database that includes the pose for the mannequin, and change a current pose of the mannequin to match the pose for the mannequin based on the record in the database.

There has thus been outlined, rather broadly, an embodiment of the invention in order that the detailed description thereof herein may be better understood, and in order that the present contribution to the art may be better appreciated. There are, of course, additional exemplary embodiments of the invention that will be described below and which will form the subject matter of the claims appended hereto.

It is to be understood that the invention is not limited in its application to the details of construction and to the arrangements of the components set forth in the following description or illustrated in the drawings. The invention is capable of embodiments in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

BRIEF DESCRIPTION OF THE DRAWINGS

The exemplary aspects of the invention will be better understood from the following detailed description of the exemplary embodiments of the invention with reference to the drawings, in which.

DETAILED DESCRIPTION

Figure 1:
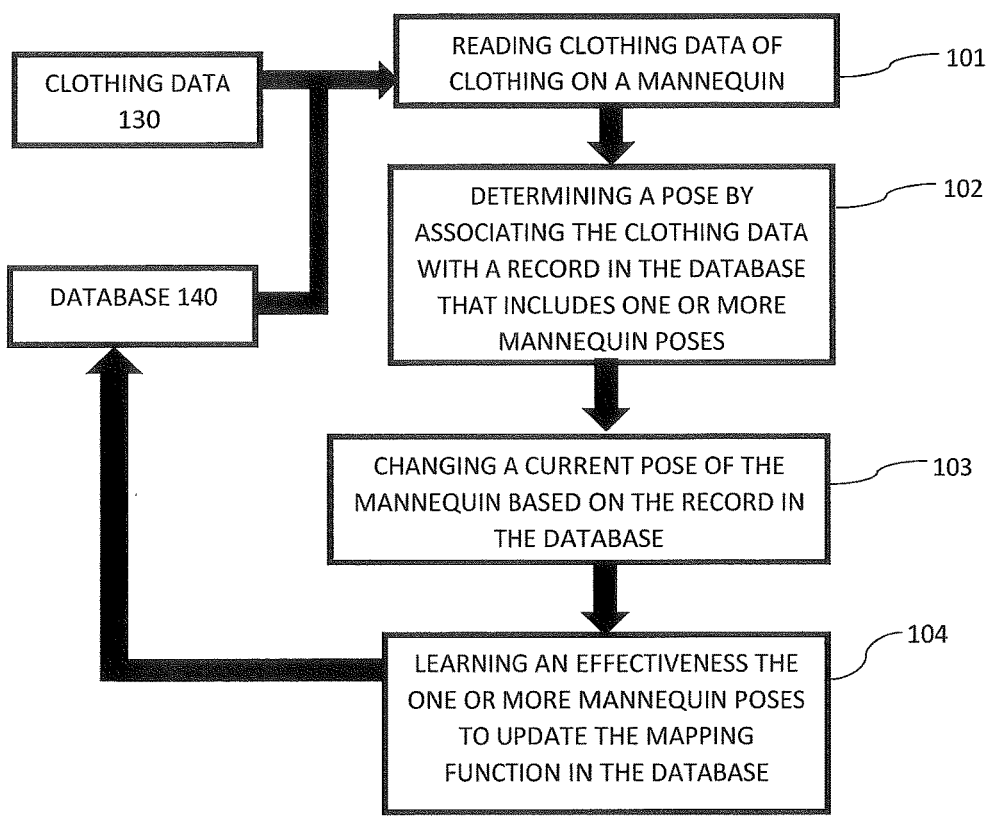
FIG. 1 depicts a high-level flow chart for a mannequin pose control method according to an embodiment of the present invention.

The invention will now be described with reference to FIGS. 1-4, in which like reference numerals refer to like parts throughout. It is emphasized that, according to common practice, the various features of the drawing are not necessarily to scale. On the contrary, the dimensions of the various features can be arbitrarily expanded or reduced for clarity. Exemplary embodiments are provided below for illustration purposes and do not limit the claims.

With reference now to FIG. 1, a mannequin pose control method 100 according to an embodiment of the present invention includes various steps to control a pose of a mannequin based on clothing data associated with a record of a database that includes a predetermined pose. As shown in at least FIG. 2, one or more computers of a computer system 12 according to an embodiment of the present invention may include a memory 28 having instructions stored in a storage system to perform the steps of FIG. 1.

Thus, a mannequin pose control method 100 according to an embodiment of the present invention may act in a more sophisticated and useful fashion, and in a cognitive manner while giving the impression of cognitive mental abilities and processes related to knowledge, attention, memory, judgment and evaluation, reasoning, and advanced computation. That is, a system can be said to be "cognitive" if it possesses macro-scale properties—perception, goal-oriented behavior, learning/memory and action—that characterize systems (i.e., humans) that are generally agreed as cognitive.

Figure 2:
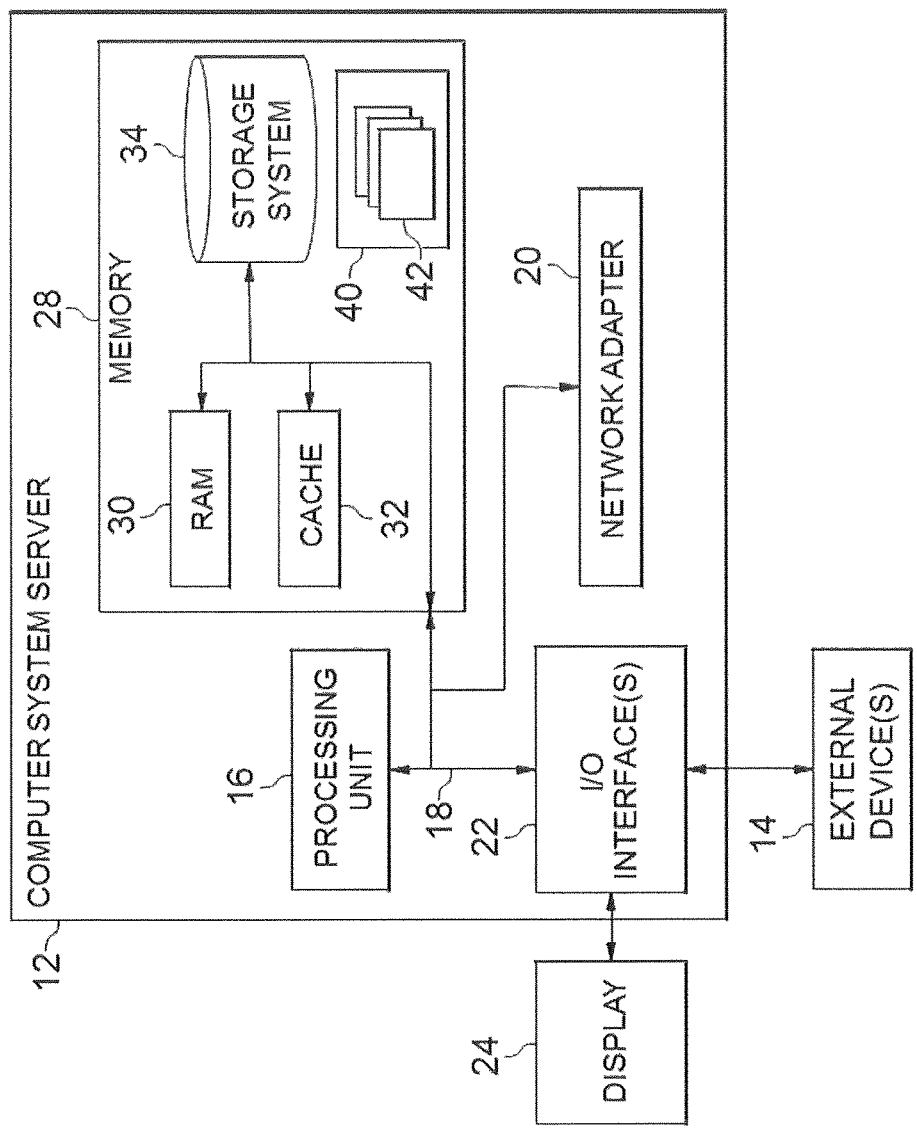
FIG. 2 depicts a cloud computing node according to an embodiment of the present invention.
Figure 3:
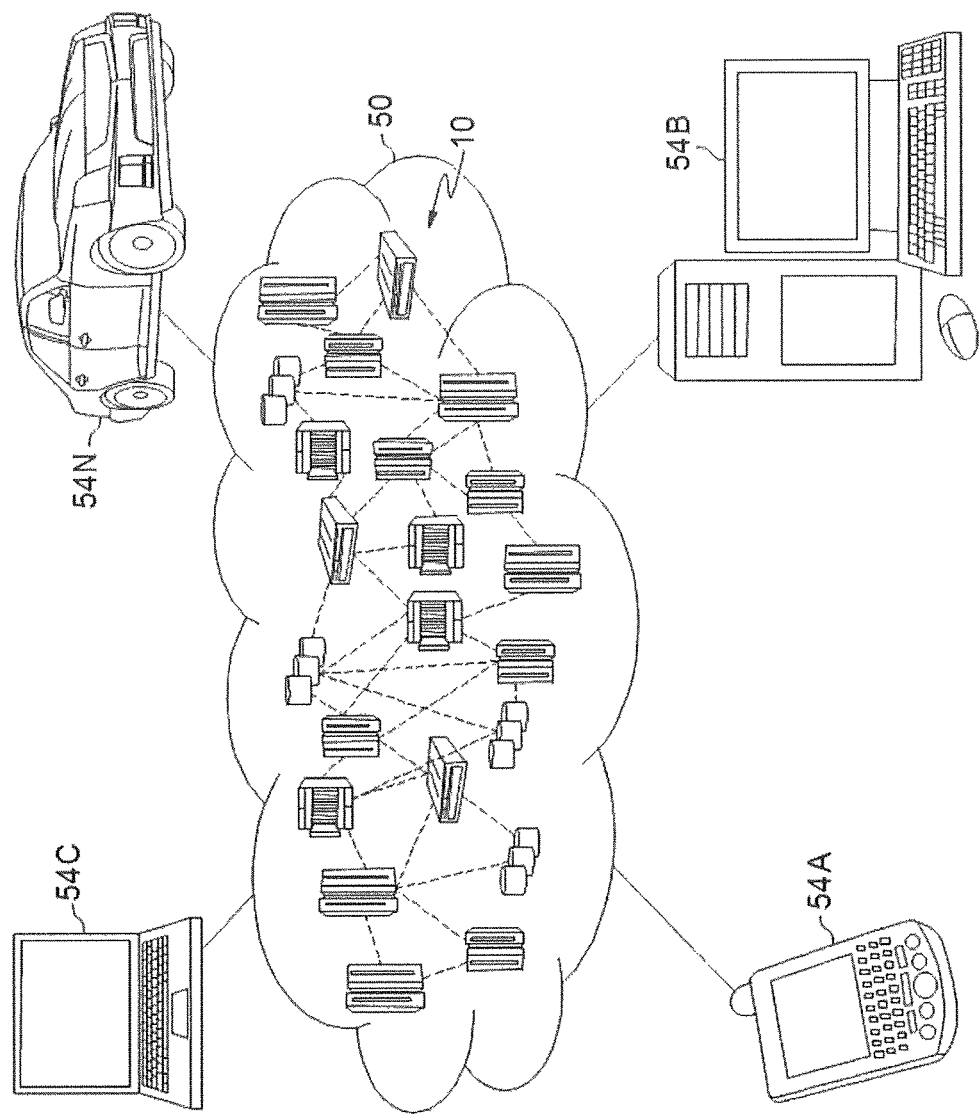
FIG. 3 depicts a cloud computing environment according to an embodiment of the present invention.

As will described/illustrated herein, one or more embodiments of the present invention (see e.g., FIGS. 2-4) may be implemented in a cloud environment 50 (see e.g., FIG. 3). It is nonetheless understood that the present invention can be implemented outside of the cloud environment.

Referring now to FIG. 1, in step 101, clothing data for a piece of clothing being displayed on a mannequin is read (e.g., analyzed). That is, a mannequin can be used by a stylist such as artists, tailors, dressmakers, window dressers and others to display clothing (e.g., shirts, pants, dresses, wedding gowns, etc.). In some embodiments, the mannequin may be a tangible mannequin, a hologram, a virtual reality avatar, etc.

Preferably, the mannequin may include a means to variably adjust a position of the mannequin's pose. For example, the mannequin can include motors to control a mannequin that has ball joints for movably connecting a neck and extremities to a two-piece trunk section. Each ball joint is provided with a built-in spring to allow free movement of the mannequin as desired by its user. The trunk sections are connected together by a flexible elbow to permit various positioning of the trunk section of the mannequin. The driving mechanism for the mannequin may include one or more motors, gears, shafts, etc.

The clothing data is read in step 101 via, for example, any of a radio-frequency identification (RFID) tag, a One-dimensional or a Two-dimensional (2D) barcode, clothing recognition (such as recognition of a label, a pattern, a color, etc.) via a camera or the like, etc. In other words, the piece of clothing includes an indicator such that the indicator is read in step 101 to determine clothing data for the piece of clothing.

In some embodiments, the clothing data may indicate a type of clothing, a style of clothing (e.g., hip-hop, casual, business attire, beach attire, fitness attire, etc.), mannequin information such as a type of mannequin, information about other mannequins in a vicinity of the mannequin or interacting with the mannequin, a list of accessories on the mannequin (e.g., jewelry, sunglasses, socks, etc.), a lighting for the mannequin (e.g., a spotlight, sunshine amount, etc.), a requirement for variability in poses, a location of a store with the mannequin, a country which the store is located, etc. The clothing data may also comprise information about an article of clothing on the mannequin and the mannequin itself. It is noted that the clothing data may include an identification number for the article of clothing such that the clothing data includes which particular item is on the mannequin. For example, an Item Model Number or an Amazon Standard Identification Number (ASIN) may be associated with each article of clothing on the mannequin. The stylist can program (e.g., input, assign, etc.) a pose associated with the particular article of clothing in the record (as described later) such that the mannequin can assume the pose desired by the stylist for that particular article of clothing (as described later). Preferably, a pose is assigned to the individual article of clothing based on the stylist's input.

In step 102, a pose for the mannequin is determined by associating the clothing data with a record in a database 140 that includes a pose for the mannequin.

In some embodiments, a record in the database may include a pose for the mannequin associated with the article of clothing. That is, the stylist can input a particular pose for a mannequin to have based on the article of clothing on the mannequin. In other words, each stylist can determine how they believe a mannequin would best pose to display the article of clothing and update the record to indicate the pose. Therefore, the clothing data for the article of clothing that includes an identifier of the article of clothing can be read in step 101, and the clothing data is associated in step 102 with the record that includes the pose for the mannequin.

In an embodiment, when a stylist wants to choose a pose to assign with an article of clothing, the record of the database 140 can be searched (accessed) to find different available poses/motions. Each pose of the records in the database 140 has tags/search terms (which include list of words that fit well with a certain style of clothing, a certain demography, etc.) associated with it, so they can be easily searched. For example, a first pose can have tags such as "hip-hop", "young-adult" and "teens" such that the stylist can search these terms and assign a pose from the search results in the record to the article of clothing.

In some embodiments, the stylist can register/add a new pose to the record. A stylist can provide an image that shows a certain pose. The input can also be a movie file to register a sequence of motions. The database processes the image/movie, extracts the poses, and converts the poses to an abstract representation of a pose to include as a record. This abstract representation of poses is stored in the database and later is used to control a mannequin.

Further, each of the types of data of the clothing data includes a preferred pose linked to the type of data.

In another embodiment, the record may include one or more poses for the mannequin for each of the types of data of the clothing data. That is, the record can comprise a mapping function that can weigh each of the variables of the clothing data to determine a pose of the one or more poses for the mannequin to take based on weighing together each of the poses associated with the clothing data to determine the pose.

Each value of the clothing data can be weighted differently and can be factored in to determine a pose. Each pose of the clothing data can be represented as a numerical value including factors of the pose such that the weight factor can be multiplied by the pose. In other words, some poses will have similar attributes that can be represented numerically (e.g., such as a coordinate position of the limbs of the mannequin in the pose).

For example, the mapping function can be a function of [w1\*(a type of clothing), w2\*(other mannequins in a vicinity of the mannequin), w3\*(an accessory on the mannequin), w4\*(a lighting), w5\*(a requirement for variability in poses), w6\*(a location of a store)].

All of the weighted factors of the mapping function are combined to calculate an optimal pose factoring in each of the types of clothing data. In this manner, the record can use the mapping function to weigh all of the read clothing data of the mannequin, and each of the poses associated with each of the types of data, to determine an optimal pose.

The weights (e.g., w1, w2 . . . w$_n$) of the mapping function can be a predetermined weight or input by the owner of the mannequin such as the store. Therefore, the store (e.g., owner of the mannequin display) can determine which factors of the clothing data to weigh the most. Preferably, the mapping function may be controlled by many parties, including the clothing designer, store chain (e.g., Macy's, Sears), etc., and interaction among such parties in a possibly collaborative fashion.

In step 103, a current pose of the mannequin is changed to match the pose of the record in the database. In other words, the mannequin assumes a pose in step 103 matching the pose of the record in the database with which the clothing data is associated.

The mannequin can change the current pose via an electronic control of a wireless signal or wired signal sent to the mannequin.

In step 104, an effectiveness of the one or more mannequin poses after the current pose is changed in step 103 is learned to update the weights of the mapping function in the database. For example, the stylist can provide a plurality of poses linked to the type of clothing. In step 104, which pose of the plurality of poses results in an increase of sales can be learned to determine the most effective pose.

In another embodiment, in step 104, an eye gaze time on the pose by viewers can be tracked to determine the effectiveness of the pose (e.g., a pose that cause a viewer to watch longer (as opposed to shorter) would be considered more effective to cause a potential sale). In this manner, the stylist can provide a plurality of poses for the store to learn which of the plurality of poses is most effective to cause an increase in sales. Thus, the weights for the mapping function can become "smarter" over time to maximize the sales caused by the poses.

In one embodiment, the style of clothing read in step 101 can override the weights of the mapping function. For example, if an RFID tag of the article of clothing is read in step 101 and the clothing data includes that the style of clothing is "children's clothes", the mapping function can include a so called "if statement" to override the type of output pose. That is, the pose for children's clothes should be appropriate for children to view and any alternative pose that may not be appropriate such as an undergarments line should not be used.

In one embodiment, if the clothing data includes information comprising other mannequins in a vicinity of the mannequin or interacting with the mannequin, the weights of the mapping function can be increased to ensure that the mannequin interacts properly with the other mannequins. For example, multiple mannequins can comprise a mannequin group display. Mannequins take poses to form an ensemble according to a given style. Multiple mannequins can be arranged in poses to communicate a message. For example, mannequins can take poses to present a group of friends having a good time. The group poses can reflect certain styles, such as "hip-hop" ensemble, or "formal". The group poses are stored in the same or in a different record as individual poses. With group poses, each mannequin is assigned its own identification within the group, and according to it, it gets its pose programmed. Therefore, if the clothing data indicates that the mannequin is part of a group, the weights can be adjusted to ensure that the pose determined by the mapping function satisfies the group pose.

In one embodiment, a stylist can include a "surfer's pose" for a pair of swim trunks and link the pose with the type of clothing (e.g., swim trunks). When the swim trunks are displayed on a mannequin, the bar code of the swim trunks is read. The clothing data for the pair of swim trunks is read from the barcode including, for example, the type of clothing (e.g., swim trunks made by the particular stylist), a style of clothing (e.g., swim wear), a type of mannequin (e.g., a tangible mannequin), an accessory on the mannequin (e.g., the mannequin is holding a surf board), a location in the store of the mannequin (e.g., in a front window display facing a particular direction). The pose for the mannequin is determined by associated the clothing data read with the record, which links a particular pose to each of the clothing data. For example, the swim trunks are linked to the pose that the stylist input to the record, the style of clothing being swim wear can be linked with a set of poses for swim wear, the location in the store can be linked with a set of poses for a mannequin that must face a particular direction, etc. The mapping function weighs each of these poses together to determine the pose for the mannequin. Then, the current pose of the mannequin is changed when the pose is determined from the record (mapping function).

Exemplary Hardware Aspects, Using a Cloud Computing Environment

Although this detailed description includes an exemplary embodiment of the present invention in a cloud computing environment, it is to be understood that implementation of the teachings recited herein are not limited to such a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platform (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client circuits through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 2, a schematic of an example of a cloud computing node is shown. Cloud computing node 10 is only one example of a suitable node and is not intended to suggest any limitation as to the scope of use or functionality of embodiments of the invention described herein. Regardless, cloud computing node 10 is capable of being implemented and/or performing any of the functionality set forth herein.

Although cloud computing node 10 is depicted as a computer system/server 12, it is understood to be operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop circuits, multiprocessor systems, microprocessor-based systems, set top boxes, programmable consumer electronics, network PCs, minicomputer systems, mainframe computer systems, and distributed cloud computing environments that include any of the above systems or circuits, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing circuits that are linked through a communications network. In a distributed cloud computing environment, program modules may be located in both local and remote computer system storage media including memory storage circuits.

Referring again to FIG. 2, computer system/server 12 is shown in the form of a general-purpose computing circuit. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external circuits 14 such as a keyboard, a pointing circuit, a display 24, etc.; one or more circuits that enable a user to interact with computer system/server 12; and/or any circuits (e.g., network card, modem, etc.) that enable computer system/server 12 to communicate with one or more other computing circuits. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, circuit drivers, redundant processing units, external disk drive arrays, RAID systems, tape drives, and data archival storage systems, etc.

Referring now to FIG. 3, illustrative cloud computing environment 50 is depicted. As shown, cloud computing environment 50 comprises one or more cloud computing nodes 10 with which local computing circuits used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing circuit. It is understood that the types of computing circuits 54A-N shown in FIG. 3 are intended to be illustrative only and that computing nodes 10 and cloud computing environment 50 can communicate with any type of computerized circuit over any type of network and/or network addressable connection (e.g., using a web browser).

Figure 4:
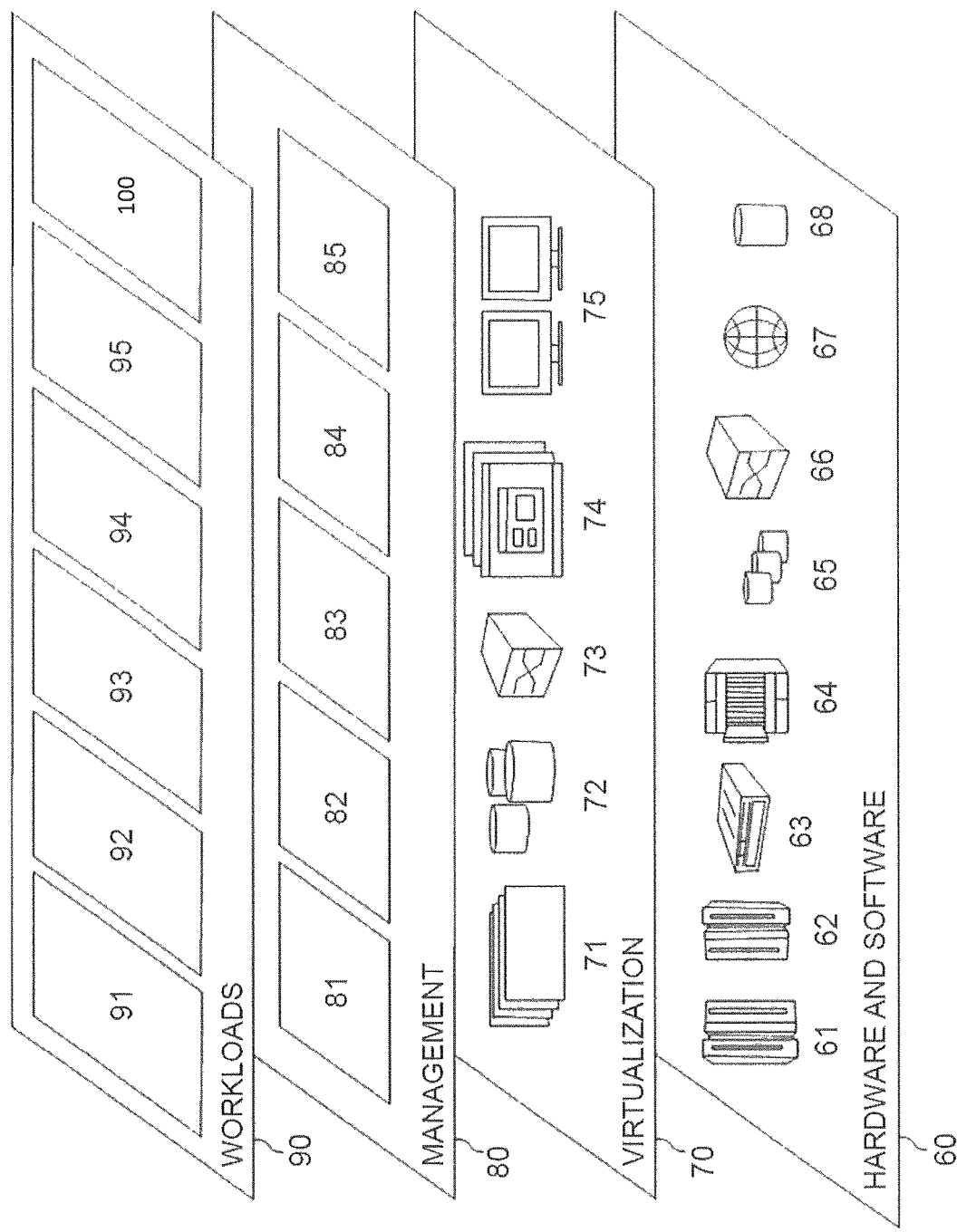
FIG. 4 depicts abstraction model layers according to an embodiment of the present invention.

Referring now to FIG. 4, a set of functional abstraction layers provided by cloud computing environment 50 (FIG. 3) is shown. It should be understood in advance that the components, layers, and functions shown in FIG. 4 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage circuits 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and, more particularly relative to the present invention, the mannequin pose control method 100.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Further, Applicant's intent is to encompass the equivalents of all claim elements, and no amendment to any claim of the present application should be construed as a disclaimer of any interest in or right to an equivalent of any element or feature of the amended claim.

What is claimed is:

1. A computer-implemented mannequin pose control method, the method comprising:
    reading clothing data of an article of clothing on a mannequin;
    determining a pose for the mannequin by associating the clothing data with a record in a database that includes the pose for the mannequin for posing with the article of clothing to attract attention, the clothing data dictating the pose for the mannequin; and
    changing a current pose of the mannequin to match the pose for the mannequin based on the record in the database.

2. The computer-implemented method of claim 1, wherein the reading reads clothing data via an indicator selected from a group consisting of:
    a radio-frequency identification (RFID) tag;
    a barcode; and
    a camera.

3. The computer-implemented method of claim 1, wherein the clothing data is selected from a group consisting of:
    a type of clothing;
    a style of clothing;
    an identification number;
    a type of mannequin;
    an accessory on the mannequin;
    a lighting for the mannequin;
    a requirement for variability in a pose;
    a location of a store with the mannequin;
    a country in which the store is located; and
    information about the article of clothing and the mannequin.

4. The computer-implemented method of claim 1, wherein the record comprises a mapping function to weigh together each type of clothing data read by the reading to determine the pose for the mannequin.

5. The computer-implemented method of claim 1, wherein the determining determines the pose by weighing clothing data associated with the record according to a mapping function.

6. The computer-implemented method of claim 1, further comprising learning an effectiveness of one or more mannequin poses after the changing changes the current pose based on at least one of sales data for the article of clothing and a viewer's gaze time on the mannequin.

7. The computer-implemented method of claim 4, further comprising learning an effectiveness of one or more mannequin poses after the changing changes the current pose to update the weights of the mapping function in the record of the database.

8. The computer-implemented method of claim 1, wherein the record comprises a link between each type of clothing data and at least one pose of the mannequin.

9. The computer-implemented method of claim 1, wherein a plurality of poses in the record are sorted based on a style of clothing such that a pose for a new article of clothing is chosen from the plurality of poses after searching the plurality of poses in the record.

10. The computer-implemented method of claim 1, wherein the record of the database is updated with a new pose associated with the clothing data based on extracting poses from one of an image and a movie.

11. The computer-implemented method of claim 1, wherein a type of the mannequin is selected from a group consisting of:
   a tangible mannequin;
   a hologram; and
   an avatar in a virtual reality world.

12. The computer-implemented method of claim 1, wherein the clothing data is linked to a pose recorded in the database, and
   wherein the determining determines the pose based on a mapping function that weighs together the pose of each type of clothing data.

13. The computer-implemented method of claim 1, embodied in a cloud-computing environment.

14. A computer program product for mannequin pose control, the computer program product comprising a computer readable storage medium having program instructions embodied therewith, the program instructions executable by a computer to cause the computer to perform:
   reading clothing data of an article of clothing on a mannequin;
   determining a pose for the mannequin by associating the clothing data with a record in a database that includes the pose for the mannequin for posing with the article of clothing to attract attention, the clothing data dictating the pose for the mannequin; and
   changing a current pose of the mannequin to match the pose for the mannequin based on the record in the database.

15. The computer program product for mannequin pose control of claim 14, wherein the record comprises a mapping function to weigh together each type of clothing data read by the reading to determine the pose for the mannequin.

16. The computer program product for mannequin pose control claim 14, wherein determining determines the pose by weighing each of the types of clothing data associated with the record according to a mapping function.

17. The computer program product for mannequin pose control of claim 14, further comprising learning an effectiveness of one or more mannequin poses after the changing changes the current pose based on at least one of sales data for the article of clothing and a viewer's gaze time on the mannequin.

18. A mannequin pose control system, said system comprising:
   a processor; and
   a memory, the memory storing instructions to cause the processor to:
      read clothing data of an article of clothing on a mannequin;
      determine a pose for the mannequin by associating the clothing data with a record in a database that includes the pose for the mannequin for posing with the article of clothing to attract attention, the clothing data dictating the pose for the mannequin; and
      change a current pose of the mannequin to match the pose for the mannequin based on the record in the database.

19. The system of claim 18, embodied in a cloud-computing environment.

20. The system of claim 18, wherein the record comprises a mapping function to weigh together each type of clothing data read by the reading to determine the pose for the mannequin.

* * * * *